(12) United States Patent
Altunbasak et al.

(10) Patent No.: US 6,459,823 B2
(45) Date of Patent: Oct. 1, 2002

(54) APPARATUS AND METHOD OF INCREASING SCANNER RESOLUTION

(75) Inventors: Yucel Altunbasak, Mountain View, CA (US); David S. Taubman, Pymble (AU)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/181,346

(22) Filed: Oct. 28, 1998

(51) Int. Cl.⁷ .............................. G06K 9/32; H04N 1/04
(52) U.S. Cl. ........................................ 382/299; 358/474
(58) Field of Search ................................. 250/234, 235, 250/208.1, 208.3; 382/254, 260, 266, 279, 284, 299, 312, 317, 321; 348/154; 358/474, 475, 481, 497; 355/53

(56) References Cited

U.S. PATENT DOCUMENTS

| | | | |
|---|---|---|---|
| 3,867,569 A | * 2/1975 | Watson | 178/7.1 |
| 5,336,878 A | 8/1994 | Boyd | 250/208.1 |
| 5,627,918 A | 5/1997 | Carasso | 382/254 |
| 5,649,034 A | 7/1997 | Sonobe | 382/298 |
| 5,689,425 A | * 11/1997 | Sainio et al. | 364/469.03 |
| 5,739,898 A | * 4/1998 | Ozawa et al. | 355/53 |
| 5,949,914 A | * 9/1999 | Yuen | 382/254 |
| 5,995,227 A | * 11/1999 | Velzel et al. | 356/360 |
| 6,005,681 A | * 12/1999 | Pollard | 358/473 |
| 6,037,584 A | * 3/2000 | Johnson et al. | 250/235 |
| 6,239,883 B1 | * 5/2001 | Lam et al. | 358/475 |
| 6,240,219 B1 | * 5/2001 | Gregory | 382/321 |

OTHER PUBLICATIONS

Patti et al., "Superresolution Video Reconstruction with Arbitrary Sampling Lattices and Nonzero Aperture Time," IEEE Transactions on Image Processing, vol. 6, No. 8, Aug., 1997, pp. 1064–1076.

Elad et al., "Restoration of a Single Superresolution Image from Several Blurred, Noisy, and Undersampled Measured Images," IEEE Transactions on Image Processing, vol. 6, No. 12, Dec., 1997, pp. 1646–1658.

European Search Report, Application No.: EP 99 30 8489, dated Sep. 29, 2000.

G. Demoment. "Image reconstruction and restoration: overview of common estimation structures and problems" IEEE Transactions on Acoustics, Speech and Signal Processing, Dec. 1989 USA, vol. 37, No. 12, pp. 2024–2036, XP002148851, ISSN: 0096–3518.

A.M. Tekalp. "High–resolution image reconstruction from lower–resolution image sequences and space–verying image restoration" IEEE International Conference on Acoustics, Speech and Signal Processing, Mar. 23–26, 1992, pp. 169–172, vol. 3, XP000378900.

M.R. Banham. "Digital image restoration" IEEE Signal Processing Magazine, Mar. 1977, IEEE, USA, vol. 14, No. 2, pp. 24–41, XP002148852, ISSN: 1053–5888.

(List continued on next page.)

*Primary Examiner*—Leo Boudreau
*Assistant Examiner*—Kanji Patel (57) ABSTRACT

Hardware resolution of a scanner is increased without improving the quality of the scanner's sensor array or imaging optics. A first low-resolution representation of an image is generated during a first scan and a second low-resolution representation of the image is generated during a second scan. The scanner is configured to intentionally induce a motion error in either the first or second representation. A composite representation of the first and second representations is generated from the first and second representations, and a super resolution technique is used to generate a third representation of the image from the composite representation. The third representation has a higher resolution than the first and second representations.

20 Claims, 5 Drawing Sheets

OTHER PUBLICATIONS

Sezan M. Ibrahim. "Survey of recent developments in digital image restoration" Optical Engineering, US, Soc. of Photo-Optical Instrumentation Engineers. Bellingham, vol. 29, No. 5, May 1, 1990, pp. 393–404, XP0001127711.

A.K. Katsaggelos. "Iterative image restoration algorithms" Optical Engineering, US, Soc. of Photo-Optical Instrumentation Engineers, Bellingham, vol. 28, No. 7, Jul. 1, 1989, pp. 735–748, XP000033800.

M. Elad. "Super-resolution reconstruction of an image" Proceedings of 19th Convention of Electrical and Electronics Engineers in Israel, Jerusalem, Israel, Nov. 5–6, 1996, pp. 391–394.

M. Elad. "Super-resolution restoration of continuous image sequence using the LMS algorithm" Eighteenth Convention of Electrical and Electronics Engineers in Israel / Tel Aviv, Mar. 7–8, 1995, pp. 2.2.5/1–5.

* cited by examiner

APPARATUS AND METHOD OF INCREASING SCANNER RESOLUTION

BACKGROUND OF THE INVENTION

The invention relates to digital imaging. More specifically, the invention relates to optical scanners and methods of increasing scanner resolution.

Scanners are typically advertised as having two resolutions: a hardware resolution and an enhanced or interpolated resolution. The hardware resolution provides a measure of the imaging ability of the scanner. A typical resolution for a low-end scanner might be 300 dots per inch ("dpi").

The hardware resolution of a scanner is dependent, in part, upon quality of the scanner's sensor array and imaging optics. Ideally, the sensor array and optics would image a point source as a point of light. In reality, however, the image is smeared. Factors contributing to the smearing of the image include the geometry of the sensor's receptive field, optical defocus and chromatic aberration effects in which different wavelengths of light from the single point source do not coincide on the sensor array's surface. Scanners including higher quality sensor arrays and imaging optics will cause less smearing than scanners including lower quality sensor arrays and imaging optics.

The enhanced or interpolated resolution, in contrast, is more a function of software. Software-based techniques such as bilinear interpolation and pixel replication are typically used to enhance the hardware resolution. For example, a hardware resolution of 300 dpi might be enhanced to a resolution of 4800 dpi. Enhancing or interpolating the hardware resolution allows the size of the scanned image to be enlarged.

However, enhancing the hardware resolution does not increase the real detail that is collected by the scanner. That is, enhancing the hardware resolution does not provide real information about the image. An exemplary bilinear interpolation algorithm might interpolate a pixel by finding four neighboring pixels, multiplying color intensities of the four neighboring pixels by weighting coefficients, and adding the results to obtain the color intensity value of the interpolated pixel. Thus, resolution enhancement is merely estimated from the information provided by the scanner, it does not increase the amount of real information obtained by the scanner.

Hardware resolution of the scanner may be increased by increasing the number of detector elements in the sensor array, using higher quality imaging optics, etc. For instance, the density of detector elements could be increased from 300 dpi to 600 dpi, or aspherical imaging lenses could be used instead of spherical imaging lenses.

However, increasing the number of detector elements and improving the quality of the imaging optics will substantially increase the cost of manufacturing the scanner. The market for scanners is fiercely competitive. Increasing hardware resolution by increasing the density of detector elements or improving the quality of the optics is something that manufacturers of low-end scanners cannot afford.

There is a need to increase the hardware resolution of a scanner without substantially increasing the cost of manufacturing the scanner.

SUMMARY Of THE INVENTION

The present invention offers an approach for increasing scanner resolution without substantially increasing the cost of manufacture. A first representation of an image is generated during a first scan of the image is performed, and a second representation of the image is generated during a second scan of the image. A motion error is intentionally induced in one of the scans. Using a super resolution technique, the first and second representations are processed to generate a third representation of the image. The third representation of the image has a higher resolution than either then first representation or the second representation.

Other aspects and advantages of the present invention will become apparent from the following detailed description, taken in conjunction with the accompanying drawings, illustrating by way of example the principles of the invention.

DETAILED DESCRIPTION OF THE INVENTION

As shown in the drawings for purposes of illustration, the present invention is embodied in an optical scanner. The invention improves the hardware resolution of the scanner without increasing the number of sensors in the sensor array or without increasing the quality of the imaging optics. Instead, the hardware resolution is improved by performing multiple scans of an image and using a super resolution technique to process outputs of the multiple scans into a high-resolution image. Thus, the invention offers a low cost approach for increasing hardware resolution of a scanner.

The scanner according to the present invention will be described below in connection with FIGS. 2 to 6. First, however, the general principle behind generating a high-resolution image from two or more low-resolution images will be described.

Figure 1:
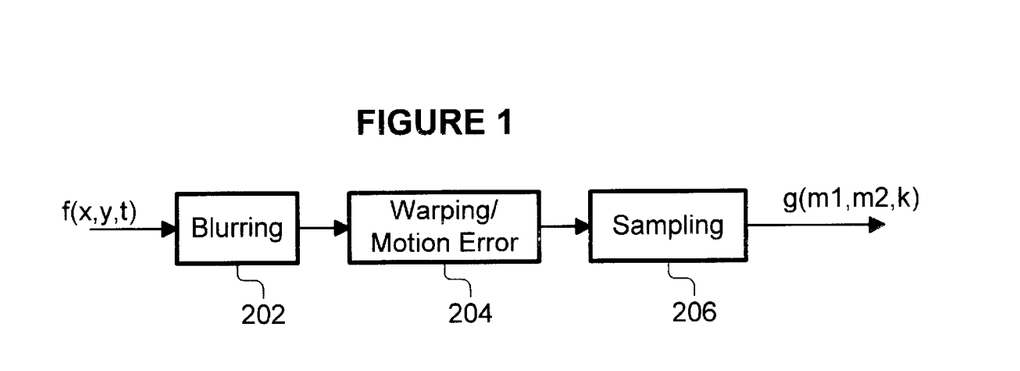
FIG. 1 is an illustration of an imaging model of a scanner.
Figure 1A:
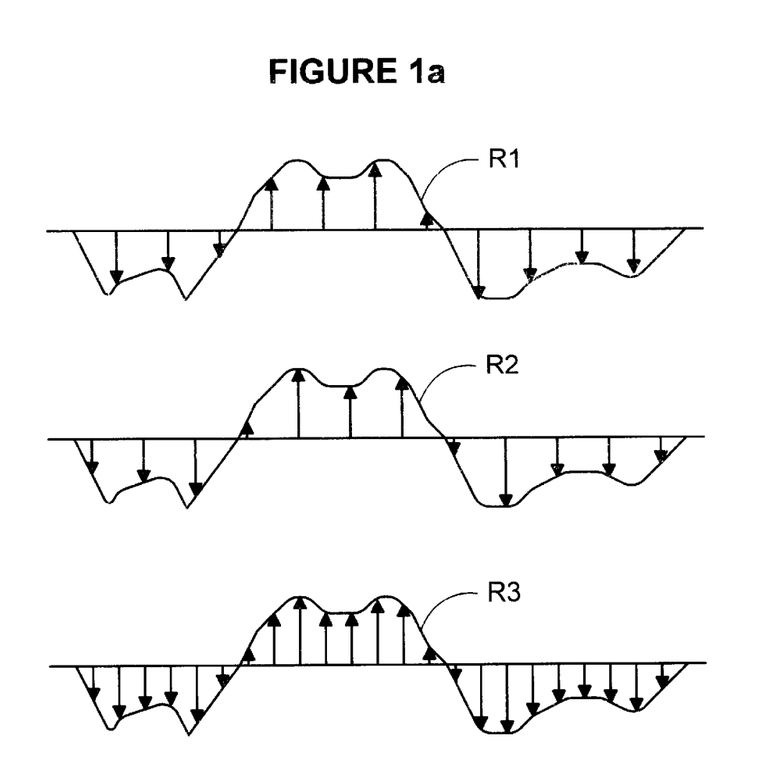
FIG. 1a is an illustration of two low-resolution representations of an image and a composite representation formed from the two low resolution representations.

Referring to FIGS. 1 and 1a, a scanner performs first and second scans of a continuous-domain image $f(x,y,t)$ to produce first and second representations R1 and R2 of the image $f(x,y,t)$. The first two variables x and y of the continuous-domain image f represent space, and the third variable t represents time. In each scan, blurring (modeled by a first block 202) of the continuous image $f(x,y,t)$ occurs due to optical lens blurring, sensor integration area blurring, etc. There is also a motion error or warping intentionally induced between successive scans of the continuous (modeled by a second block 204). The continuous-domain image $f(x,y,t)$ is sampled to produce a low-resolution digital image $g(m1, m2, k)$ where k is a scan index (modeled by a third block 206). Thus, the first representation R1 includes a first sequence of sample values, and the second representation R2 includes a second sequence of sample values. The image is intentionally shifted relative to the scanner during the second scan to create the motion error. Consequently, the first value g(1,1,1) in the first representation R1 corresponds to a different part of the image than the first value g(1,1,2) in the second representation R2. Thus, each scan yields different information about the image.

The sample values of the first and second image representations R1 and R2 are combined into a more densely sampled, composite representation R3. A high-resolution representation R4 of the continuous-domain image f(x,y,t) can then be obtained from composite image R3.

A super resolution technique can then be used to generate the high-resolution representation R4 of the image from the composite representation R3. In the frequency domain, the relationship of the composite representation R3 to a continuous high-resolution representation R4 might be as follows:

$$R3=D(W(PSF*R4))$$

where D is the downsampling; W is the intentional shift or motion warp, PSF is the Point Spread Function of the scanner (which takes into account sensor integration blur, optical lens blur, etc.), and the operator "*" represents a convolution operation. There may be a single PSF corresponding to the scanner, a PSF corresponding to each detector element in the scanner, etc.

Given the Point Spread Function of the scanner and the amount of intentionally induced motion error, the composite representation R3 can be deconvolved into the high-resolution representation R4. In this manner, the scanner can generate a higher resolution representation R4 of the image from lower resolution representations R1 and R2. Thus, hardware resolution of the scanner can be improved without increasing the cost of the scanner's sensor array or imaging optics.

Figure 2:
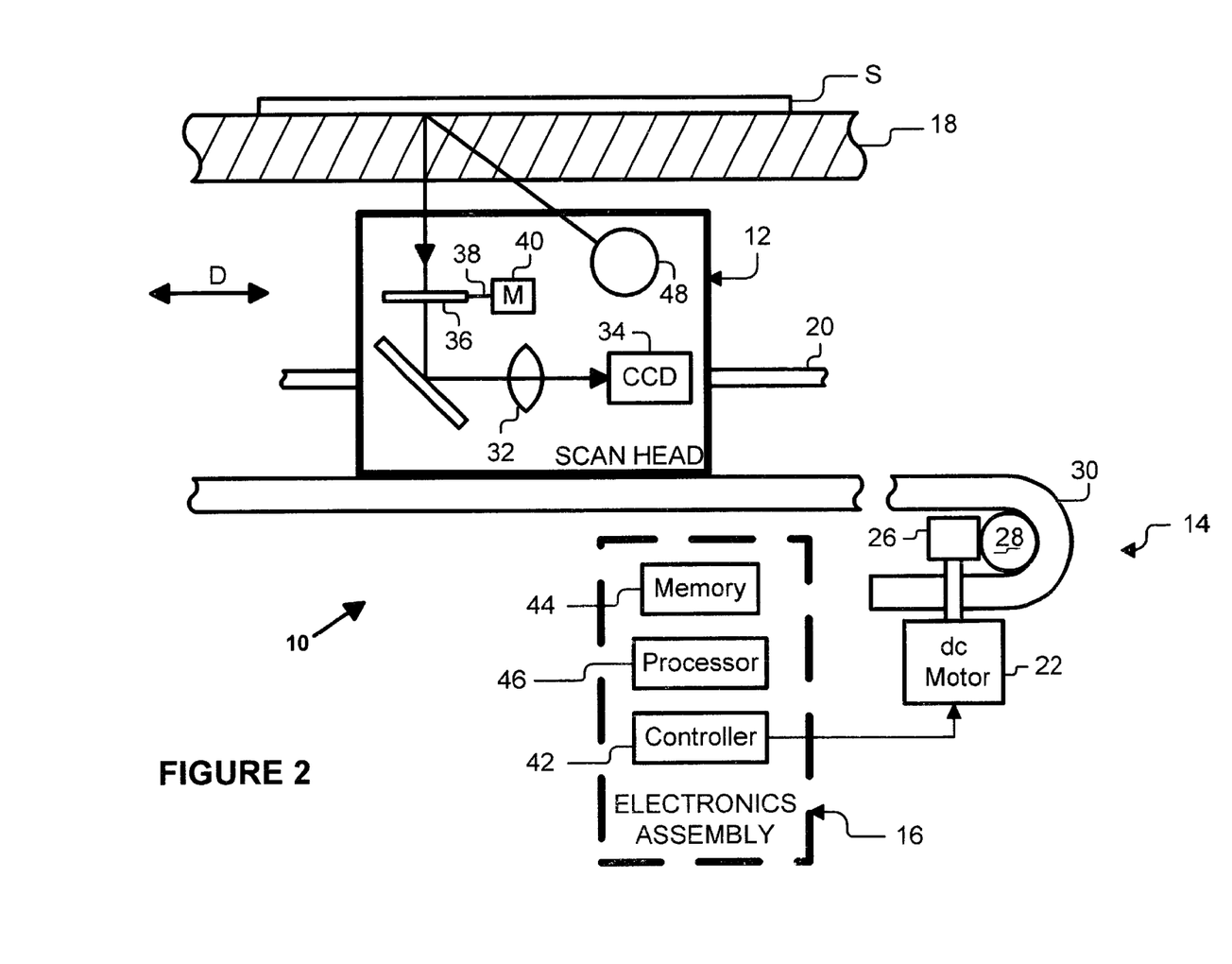
FIG. 2 is an illustration of a scanner according to the present invention.

Reference is now made to FIG. 2, which shows a flatbed scanner 10 according to the present invention. The flatbed scanner 10 includes a scan head 12, a dc motor drive assembly 14, an electronics assembly 16, a glass pane 18 and a housing (not shown). The glass pane 18 and the housing form an enclosure inside which the scan head 12, the motor drive assembly 14 and the electronics assembly 16 are mounted. The glass plane 18 also defines a scanning plane.

The dc motor drive assembly 14 includes a pair of slider rods 20 for guiding the scan head 12 in a linear direction along the glass pane 18, and a dc motor 22 and transmission for moving the scan head 12 along the slider rods 20. The dc motor 22 can be a brush or brushless dc motor. The transmission is typical to flatbed scanners: a motor shaft 24 turns a worm gear 26, which drives a gear 28, which turns a timing belt 30. The timing belt 30 moves the scan head 12 in a first, scanning direction, which is indicated by an arrow D. The sensor array 34 moves with the scan head 12 in the scanning direction D.

Figure 2A:
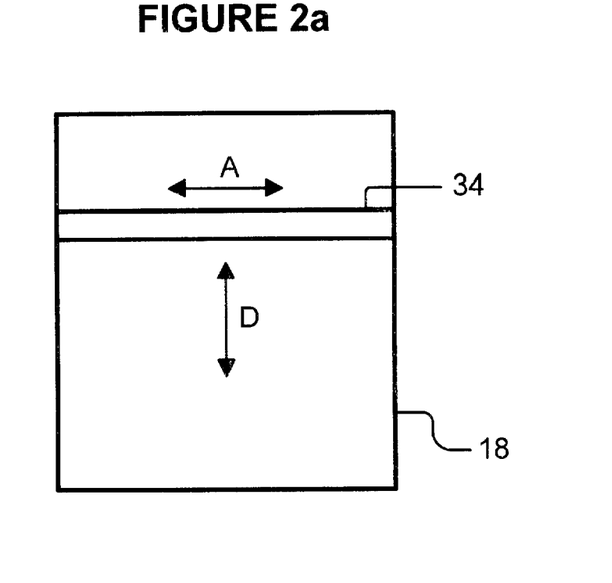
FIG. 2a is an illustration of a sensor array of the scanner.

Referring additionally to FIG. 2a, the scan head 12 includes imaging optics 32 and a sensor array 34. The sensor array 34 might be a CCD array having a resolution of 300 dpi. The CCD array of the scan head 12 might include three color sensors at each pixel location or CCD cell. The cells extend in a second direction indicated by the arrow A. A linear response of the sensor array 34 is preferred but not required.

The scan head 12 further includes a device that induces intentional motion error between successive scans. The motion error may be a global translational or affine motion between the successive scans.

Figure 3:
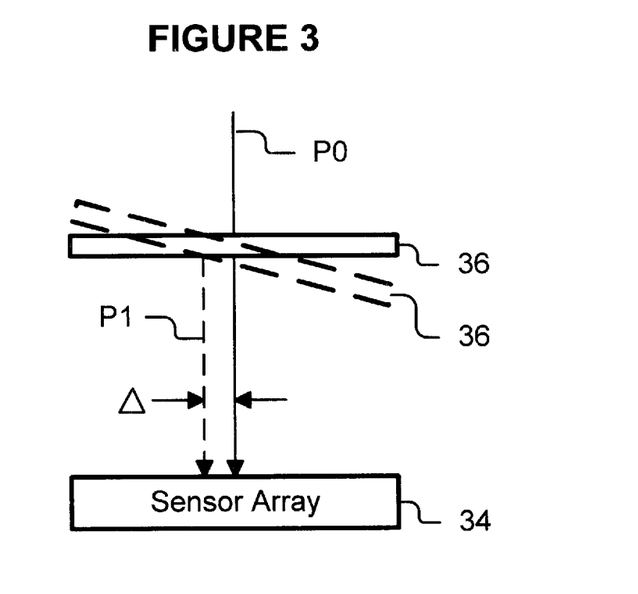
FIG. 3 is an illustration of light rays passing through a deflection plate of the scanner.

A number of different approaches may be used to induce the motion error. One such approach is shown in FIGS. 2 and 3. A light-transmissible plate 36 is placed in an optical path between the sensor array 34. The plate 36 is movable between a first position a second position. During a first scan, the plate 36 is moved to the first position by a second motor 38 and linkage 40. Light reflected at the scanning plane is transmitted by the plate 36 without changing the direction of the beam light (i.e., the light is normal to the light-receiving surface of the plate 36), and the transmitted light impinges a light-receiving surface of the sensor array 34. The path of the light transmitted by the plate 36 during the first scan is indicated by the solid line P0. During a second scan, the plate 36 is moved or tilted to the second position. When moved to the second position, the plate 36 changes the direction of the light path, as indicated by the dashed line P1. Thus, the sensor array 34 "sees" different images during the first and second scans. The plate 36 may be moved to produce a motion error Δ between fractional values of 0.35 and 0.65 pixels (e.g., 0.40 pixels, 1.40 pixels). A motion error Δ of 0.5 pixels would improve resolution by a factor of two.

The plate 36 may be made of an optical quality glass. The material for the plate 36 is homogenous such that direction changes are relatively uniform across the plate 36. It would be undesirable for the beam P0 to be deflected by one degree at one portion of the plate 36 and by two degrees at another portion of the plate 36. Dimensions of the plate 36 could include, for example, a thickness of one millimeter, a length of one or two centimeters, and a width of one centimeter.

The electronics assembly 16 includes a controller 42 for controlling the operation of the scanner 10. Among its functions, the controller 42 controls the dc motor 22 to move the scan head 12 along the slider rods 20, and the controller 42 controls the second motor 38 and linkage 40 to move the plate 36 between the first and second positions. The controller 42 can control the second motor 38 and linkage 40 to cause a precise motion error. In the alternative, the motion error need not be controlled precisely. Instead, the plate 36 may be moved cause an approximate subpixel error, and the precise motion error Δ could be determined by a motion estimation algorithm in software (e.g., a host computer) or hardware (e.g., the controller 42).

To scan a sheet S of paper, the sheet S is positioned atop the glass pane 18, and a host (e.g., a personal computer) commands the electronics assembly 16 to scan the sheet S. Under control of the controller 42, the second motor 38 and linkage 40 move the plate 36 to the first position, and the dc motor drive assembly 14 moves the scan head 12 along the slider rods 20 to an initial position (e.g., a wall) and then starts moving the scan head 12 along the slider rods 20. A fluorescent bulb 48 in the scan head 12 is turned on to illuminate a portion of the sheet S with white light, and the imaging optics 32 focuses an image of the illuminated portion onto the sensor array 34. The sensor array 34 is exposed to, and integrates, a line of pixels at a time, and the electronics assembly 16 processes signals generated by the sensor array 34 and buffers a first representation of the scanned image in memory 44.

After the first scan is completed, the controller 42 commands the dc motor assembly 14 to return the scan head 12 to the initial position, and the controller 42 commands the second motor 38 and linkage 40 to move the plate 36 to the second position. After the plate 36 has been moved to the second position, a second scan is performed. During the second scan, the plate 36 changes the direction of the light reflected by the sheet S and thereby causes the sensor array 34 to see a different image of the sheet S. A second representation of the scanned image is buffered in the memory 44.

After the second scan has been completed, the first and second representations are processed into a higher resolution representation. Processing can be performed by an on-board processor 46. In the alternative, the low-resolution representations may be sent to the host, which would generate the high-resolution image. FIG. 2 happens to show a scanner 10 that performs the processing.

The memory 44 also stores the Point Spread Function of the scanner 10 and a program that instructs the processor 46 to generate the composite representation from the two low resolution representations, and use the Point Spread Function and a super resolution algorithm to process the composite representation into the high resolution representation. The high-resolution representation is then sent to the host.

There are a number of different super resolution algorithms that could be used to generate the high-resolution representation. Exemplary super resolution algorithms include the Projections onto Convex Sets-based algorithm ("POCS"); and the Maximum A-posteriori Probability estimation based algorithm ("MAP").

Figure 4:
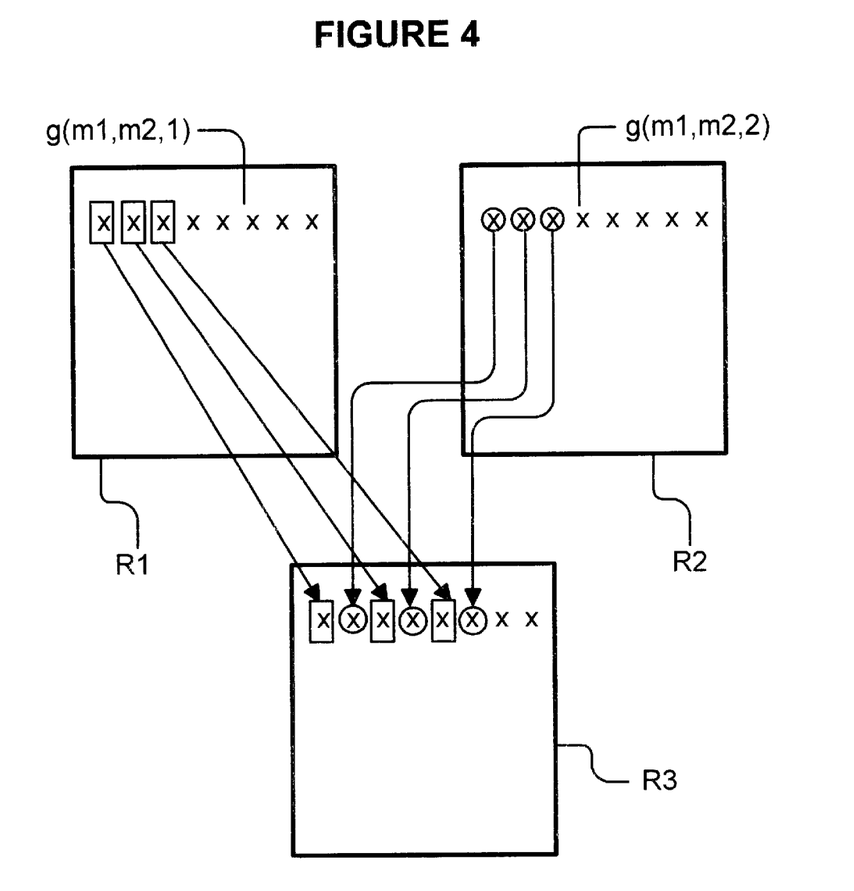
FIGS. 4 and 5 illustrate a method of generating a high resolution representation from two lower resolution representations.
Figure 5:
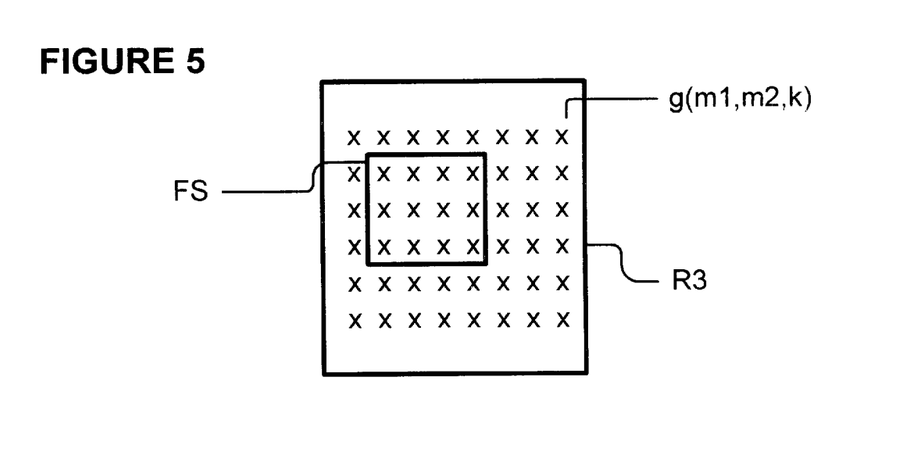

A faster algorithm that uses linear filtering is illustrated in FIGS. 4 and 5. FIG. 4 shows that the composite representation R3 is formed by interleaving the two low-resolution representations R1 and R2. For example, a 600×600 dpi composite image could be formed from two low-resolution 300×600 dpi images.

FIG. 5 shows that the composite representation R3 is then convolved with an N×M filter support FS as follows to produce the high-resolution representation R4:

$$f(n1, n2) = \sum_{i=-N}^{N} \sum_{j=-M}^{M} s(n1 + i, n2 + j) w(i, j)$$

where f(n1, n2) is a pixel in the high-resolution representation R4; s(n1+i, n2+j) is a pixel in the composite representation R3, and w(i,j) is a weighting coefficient.

The weighting coefficients w may be determined by the algorithm disclosed in U.S. Ser. No. 09/177,729 filed on Oct. 23, 1998, assigned to the assignee of the present invention, and incorporated herein by reference.

The weighting coefficients w could instead be determined via a POCS technique or a frequency domain technique. Such techniques are disclosed in T. S. Huang and R. Y. Tsui, "Multiple frame image restoration and registration," *Advances in Computer Vision and Image Processing*, vol. 1, 1984, pp. 317–39; R. R. Schultz and R. L. Stevenson, "Improved definition video frame enhancement" *IEEE Int. Conference on Acoustics, Speech and Signal Processing*, vol. IV, May 1995, pp. 2169–2172; and A. M. Tekalp, M. K. Ozkan and M. I. Sezan, "High resolution image reconstruction from lower resolution image sequences and space varying image restoration," *IEEE Int. Conference on Acoustics, Speech and Signal Processing*, vol. III, March 1992, pp. 169–172

The Point Spread Function of the scanner can be measured directly. For example, interferometrically generated sinusoidal imaging targets could measure the Point Spread Function. See, for example, J. Grievenkamp and A. Lowman, "Modulation transfer function measurement of sparse-array sensors using a self-calibrating fringe pattern," *Applied Optics*, Vol. 33, No. 22, pp. 5029–36, August 1994; and S. Johansson et al., "Experimental MTF measurements of CCD using an interferometrically generated test pattern," *Journal of Imaging Science*, Vol. 35, No. 5, pp 320–25, September-October 1991.

In the alternative, the Point Spread Function could be estimated from Line Spread Functions ("LSF") of the sensor array 34. Estimating the PSF from the LSF can be done in any number of ways. See, for example, A. Bewsher and l. Powell, "Optical transfer function measurement facility for aerial survey cameras," *Applied Optics*, Vol. 33, No. 28, pp. 6573–77, October 1994.

The Line Spread Function possesses a useful number of properties from a measurement standpoint. Fine lines on an image target can closely approximate an impulsive line, while providing sufficient illumination to achieve meaningful sensor responses. The Line Response Function is a one-dimensional function; therefore, accurate, densely sampled Line Response Function measurements would appear to be much more feasible from a single exposure to some appropriate imaging target. Additionally, the simple geometry of a linear stimulus could be exploited to recover precise relative displacements between the line and the sensor array 34.

Figure 6:
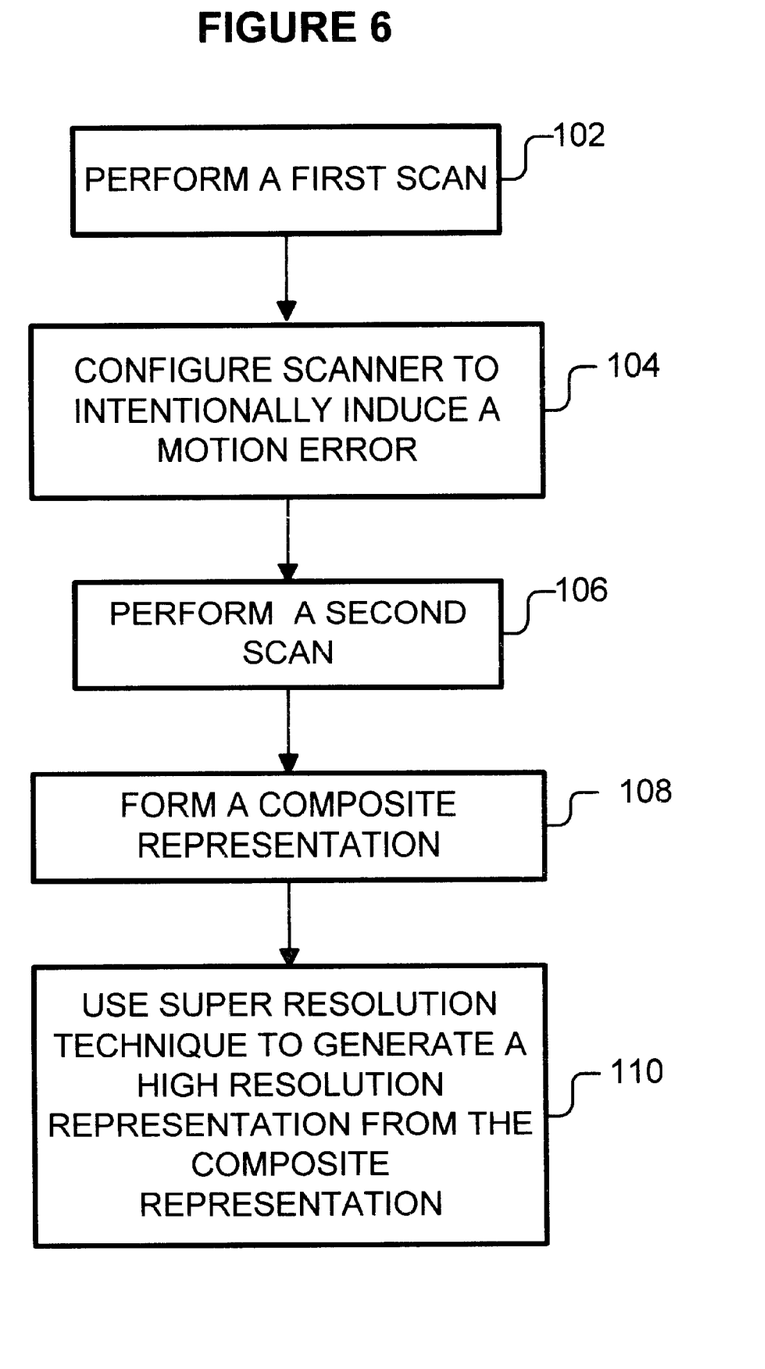
FIG. 6 is a flowchart of a method of performing a scanning operation according to the present invention.

FIG. 6 shows a generalized method of using a scanner to generate a high-resolution representation of an image. A first scan of the image is performed to produce a first representation of the image (block 102).

The scanner is then configured to cause a motion error in next scan (block 104). The motion error could be induced by moving the plate 36. Instead of using the plate 36 to induce motion error between the first and second representations, the motion error could be induced by offsetting the initial position of the scan. For example, the first scan could be started at the wall, and the second scan could be started at a distance of, say, 0.5 pixels from the wall.

After the scanner has been configured to cause a motion error, a second scan of the image is performed to produce a second representation of the image (block 106). A motion error exists between the first and second representations.

A composite representation is then formed from the first and second representations of the image (block 108). A super resolution technique is then used to generate a high-resolution representation of the image from the composite representation (block 110). For example, a linear filtering method may be used to generate the high-resolution image from the composite representation.

Thus disclosed is an invention that increases hardware resolution of a scanner without increasing the quality of the sensor array or imaging optics of the scanner. The addition of the plate 36 and second motor 38 and linkage 40 adds little to the cost of manufacturing the scanner 10. If the initial position of the scan head 12 can be controlled to induce the motion error, the plate 36 and motor 38 and linkage 40 would not be needed, and the higher resolution could be obtained without an additional increase in the cost of hardware.

The present invention is not limited to the specific embodiments described and illustrated above. For example, the present invention is not limited to a particular super resolution algorithm. Other algorithms that process the composite representation into a high-resolution representation could be used.

The composite representation could be formed from more then two low-resolution representations. Step size of the first motor 22 would be adjusted to achieve the proper motion error in the scanning direction D for each scan. Step size of the second motor 38 would be adjusted to achieve the proper motion error in the second direction A, Additional representations having additional motion error would increase the density of the composite representation and thereby increase the resolution of high-resolution representation in the scanning direction D.

The motion error may be non-translational. If a non-translational motion error is intentionally induced, a super resolution algorithm based on POCS could be used. Moreover, the motion error may be induced in both directions A and D or only in a single direction A or D. For example, the plate 36 may be used to induce motion error in the scanning and second directions D and A; or the plate 36 may be used to induce motion error in the second direction A and the dc motor drive assembly 14 may be used to induce motion error in the scanning direction D; or the plate 36 may be used to induce motion error only in the scanning direction D or only in the second direction A; or the dc motor drive assembly 14 may be used to induce motion error only in the scanning direction D.

The processing could be performed on-board the scanner 10. In the alternative, the processing could be performed off-board the scanner by an external device such as the host computer.

The location of the plate 36 is not limited to the optical path between the glass pane 18 and the sensor array 34. The plate 36 could be placed along the optical path between the light source 48 and the glass pane 18.

Instead of using the plate 36 to induce the motion error between the first and second representations, the motion error could be induced by offsetting the initial position of the scan. Optical elements other than a flat, transmissive plate 36 could be used. Optical elements such as prisms or diffraction gratings could be used instead.

Therefore, the invention is not limited to the specific embodiments described and illustrated above. Instead, the invention is construed according to the claims that follow.

What is claimed is:

1. A method of scanning an image, the method comprising:
   performing a first scan of the image to produce a first representation of the image;
   performing a second scan of the image to produce a second representation of the image, a motion error having been intentionally induced between the first and second representations so that different portions of the image are detected;
   using a super resolution technique to generate a third representation of the image from the composite representation, the third representation having a higher resolution than the first and second representations.

2. The method of claim 1, wherein a scanner is used to perform the first and second scans, the scanner having a known optical transfer function, and wherein the optical transfer function and the amount of the motion error are used to generate the third representation from the composite representation.

3. The method of claim 2, wherein the optical transfer function is an estimate of a Point Spread Function of the scanner, the estimate being based on Line Spread Functions of the scanner.

4. The method of claim 1, further comprising configuring the scanner to shift the second scans to cause the motion error, the scanner being configured between the first and second scans.

5. The method of claim 4, wherein the scanner includes a sensor array and a light source, and wherein the scanner is configured by changing an optical path between the light source and the sensor array.

6. The method of claim 4, wherein the scanner is configured by starting the second scan at a different initial position than the first scan.

7. The method of claim 1, wherein the motion error is a subpixel displacement.

8. The method of claim 7, wherein the motion error is between fractional values of 0.35 and 0.65 pixels.

9. The method of claim 1, further comprising taking at least one additional scan of the image to produce at least one additional representation of the image, a motion error having been intentionally induced in each additional scan, each additional representation being used to generate the third representation of the image.

10. The method of claim 1, wherein the super resolution algorithm includes one-pass linear filtering of the first and second representations.

11. The method of claim 10, wherein the composite representation is produced by interleaving the first and second representations; and wherein the third representation is produced by convolving the composite representation with an N×M filter.

12. A scanning system comprising:
   a sensor array movable along a scanning plane; means for selectively inducing a motion error in a representation produced by the sensor array; and
   a processor for generating a composite representation from a first representation and a second representation, the means having created a motion error between the first and second representation so that the first representation is different than the second representation, the processor using a super-resolution algorithm to generate a high resolution image from composite representation.

13. The system of claim 12, wherein the scanning system has a known optical transfer function, wherein the optical transfer function is an estimate of a Point Spread Function of the scanner, the estimate being based on Line Spread Functions of the scanner, and wherein the amount of the motion error and the estimate of the Point Spread Function are used to generate the high resolution representation from the composite representation.

14. The system of claim 12, wherein the scanner includes a sensor array and a light source, and wherein the means includes at least one optical element moveable to change an optical path between the light source and the sensor array.

15. The system of claim 12, wherein the scanner further comprises a light source, a first optical light path being between the light source and the scanning plane, a second optical path being between the scanning plane and the sensor array, and wherein the means includes an optical element disposed along one of the first and second optical paths, the optical element being operable to cause a change of the second optical path relative to the sensor array and thereby induce a subpixel motion error in a representation generated by the scanner during a scanning operation.

16. The system of claim 12, wherein the processor generates the high resolution representation by interleaving the first and second representations into a composite representation; and convolving the composite representation with an N×M filter to produce the high resolution representation.

17. A scanner comprising:
   a sensor array movable along a scanning plane;
   a light source for generating a scanning beam during a scanning operation, the scanning beam following a first optical path between the light source and the scanning plane;
   imaging optics disposed along a second optical path between the scanning plane and the sensor array; and
   an optical element disposed along one of the first and second optical paths, the optical element being operable to cause a change of the second optical path relative to the sensor array and thereby induce a subpixel motion error in a representation generated by the scanner during a scanning operation.

18. The scanner of claim 17 wherein the optical element includes a beam-transmissive plate; and wherein the scanner further includes an electromechanical actuator for moving the plate to change the second optical path.

19. The scanner of claim 17, further comprising a processor for generating a composite representation from the first and second representations and using a super-resolution algorithm to generate a high resolution representation from the composite representation.

20. The scanner of claim 19, wherein the processor generates the high-resolution representation by interleaving the first and second representations into a composite representation; and convolving the composite representation with an N×M filter to produce the high resolution representation.

* * * * *